(12) United States Patent
Lee (10) Patent No.: US 10,608,220 B2
(45) Date of Patent: Mar. 31, 2020

(54) BATTERY PACK COMPRISING FIRE EXTINGUISHING DEVICE, AND CONTROL METHOD USING SAME

(71) Applicant: LG CHEM, LTD., Seoul (KR)

(72) Inventor: Ki-Young Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 67 days.

(21) Appl. No.: 15/757,476

(22) PCT Filed: Aug. 23, 2016

(86) PCT No.: PCT/KR2016/009333
§ 371 (c)(1),
(2) Date: Mar. 5, 2018

(87) PCT Pub. No.: WO2017/090866
PCT Pub. Date: Jun. 1, 2017

(65) Prior Publication Data
US 2018/0248160 A1    Aug. 30, 2018

(30) Foreign Application Priority Data

Nov. 26, 2015  (KR) .................. 10-2015-0166475
Aug. 18, 2016  (KR) .................. 10-2016-0105058

(51) Int. Cl.
*H01M 2/10* (2006.01)
*H01M 10/42* (2006.01)
(Continued)

(52) U.S. Cl.
CPC ........ *H01M 2/1077* (2013.01); *A62D 1/0014* (2013.01); *A62D 1/0028* (2013.01);
(Continued)

(58) Field of Classification Search
None
See application file for complete search history.

(56) References Cited

U.S. PATENT DOCUMENTS

| 9,806,325 B2 | 10/2017 | Woehrle et al. |
| 2006/0093896 A1* | 5/2006 | Hong .................... H01M 2/34 429/61 |
| 2007/0164711 A1 | 7/2007 | Kim et al. |
| 2012/0108716 A1 | 5/2012 | Morikawa et al. |

(Continued)

FOREIGN PATENT DOCUMENTS

| JP | 2002-289265 A | 10/2002 |
| JP | 2010-097836 A | 4/2010 |

(Continued)

OTHER PUBLICATIONS

International Search Report for PCT/KR2016/009333 (PCT/ISA/210) dated Dec. 20, 2016.

*Primary Examiner* — Wyatt P McConnell
(74) *Attorney, Agent, or Firm* — Birch, Stewart, Kolasch & Birch, LLP (57) ABSTRACT

Provided are a battery pack and a control method using the same, the battery pack having improved safety so as to prevent fire or prevent fire from spreading even if ignited, thereby reducing the risks which can occur during ignition. The battery pack, according to the present invention, comprises: an electrode assembly comprising an anode, a cathode, and a separator; and a single cell or a plurality of cells having a pouch-shaped battery case for accommodating the electrode assembly, wherein the cell is accommodated and stacked by the module case, the module case comprises a fire suppression agent or a fire extinguishing agent at the inner or outer part thereof such that the fire suppression agent or the fire extinguishing agent is automatically discharged from the module case when cell swelling occurs.

13 Claims, 7 Drawing Sheets

(51) Int. Cl.
*H01M 10/48* (2006.01)
*B60L 58/10* (2019.01)
*A62D 1/00* (2006.01)
*B60L 3/00* (2019.01)
*B60L 3/04* (2006.01)
*H01M 2/02* (2006.01)
*H01M 10/0525* (2010.01)

(52) U.S. Cl.
CPC ............... *B60L 3/0046* (2013.01); *B60L 3/04* (2013.01); *B60L 58/10* (2019.02); *H01M 2/024* (2013.01); *H01M 2/1094* (2013.01); *H01M 10/425* (2013.01); *H01M 10/4207* (2013.01); *H01M 10/48* (2013.01); *H01M 10/0525* (2013.01); *H01M 2010/4271* (2013.01); *H01M 2200/20* (2013.01); *H01M 2220/20* (2013.01); *Y02E 60/122* (2013.01)

(56) References Cited

U.S. PATENT DOCUMENTS

| 2013/0207018 | A1  | 8/2013 | Woehrle et al. |
| 2014/0014376 | A1* | 1/2014 | Schaefer ................. A62C 3/16 169/46 |
| 2014/0017525 | A1  | 1/2014 | Schaefer |
| 2014/0170447 | A1* | 6/2014 | Woehrle ................. A62C 3/07 429/61 |

FOREIGN PATENT DOCUMENTS

| JP | 2011-254906 A | 12/2011 |
| JP | 2012-252909 A | 12/2012 |
| JP | 2015-162285 A | 9/2015 |
| KR | 10-2009-0026648 A | 3/2009 |
| KR | 10-2014-0005146 A | 1/2014 |
| KR | 10-2014-0005323 A | 1/2014 |

* cited by examiner

BATTERY PACK COMPRISING FIRE EXTINGUISHING DEVICE, AND CONTROL METHOD USING SAME

TECHNICAL FIELD

The present disclosure relates to a battery pack, and more particularly, to a battery pack including a fire extinguishing device for effectively stopping fires caused by cell overcharge or failure at the early stage. Furthermore, the present disclosure relates to a method for controlling a vehicle including the battery pack. The present application claims priority to Korean Patent Application No. 10-2015-0166475 filed in the Republic of Korea on Nov. 26, 2015 and Korean Patent Application No. 10-2016-0105058 filed in the Republic of Korea on Aug. 18, 2016, the disclosures of which are incorporated herein by reference.

BACKGROUND ART

Recently, there is dramatically growing demand for portable electronic products such as laptop computers, video cameras and mobile phones, and with the extensive development of electric vehicle, accumulators for energy storage, robots and satellites, many studies are being made on high performance secondary batteries that can be recharged repeatedly. Particularly, lithium secondary batteries are gaining more attention than nickel-based secondary batteries because of their advantages; lithium secondary batteries have little or no memory effects so that they can be freely charged and discharged, and have a very low self-discharge rate and high energy density.

A lithium secondary battery mainly uses lithium-based oxide and carbon material for a positive electrode active material and a negative electrode active material, respectively. The lithium secondary battery includes an electrode assembly composed of a positive electrode plate and a negative electrode plate respectively coated with the positive electrode active material and the negative electrode active material, with a separator interposed between, and a packaging, also known as a battery case in which the electrode assembly and an electrolyte solution are received and which is hermetically sealed.

More recently, secondary batteries are widely used in not only small-sized devices such as mobile electronic devices, but also medium- and large-sized devices such as vehicles or energy storage systems. Particularly, with the gradual depletion of carbon energy and the increasing interest in environment, the demand for hybrid electric vehicles and electric vehicles is increasing all over the world, including US, Europe, Japan, and Korea. The most essential component of a hybrid electric vehicle or electric vehicle is a battery pack which gives a driving force to a vehicle motor. Since hybrid electric vehicles or electric vehicles obtain a driving force through charging/discharging of the battery pack, they have higher fuel efficiency than vehicles using only an engine, and have little or no pollutant emission. That is the reason why the number of users is increasing. Furthermore, the battery pack of hybrid electric vehicles or electric vehicles includes multiple secondary batteries, and the multiple secondary batteries are connected in series and in parallel to improve the capacity and output.

Vehicles using electrical energy are directly influenced by the performance of the battery pack, requiring a battery management system (BMS) that efficiently manages the charge/discharge of each secondary battery by measuring the voltage of each secondary battery and the voltage and current of all the secondary batteries, and detects any degraded or failed secondary battery from the secondary batteries so that each secondary battery has the maximum performance.

Hybrid electric vehicles or electric vehicles have a large capacity battery pack mounted thereon to supply sufficient energy necessary for the system, bringing properties of high voltage and high current. Accordingly, safety is most important of all. Particularly, the high capacity battery pack has risks of fire and explosion caused by over-charging and over-current, and in the event of a fire caused by failure and malfunction of the BMS which controls the battery pack, the safety of the vehicle and the system will be noticeably threatened.

To eliminate the risks, conventionally, fires were detected using a temperature sensor and a current/voltage sensor, and a fire extinguisher provided separately from the battery pack brought into action when a fire was detected. However, the conventional fire detecting and extinguishing methods need a temperature sensor and a current/voltage sensor, and these sensors lack accuracy in diagnosing fires at the early stage, often failing to protect vehicles and people, and especially during self-reaction, the role of the BMS is insignificant, causing damage to vehicles and people.

DISCLOSURE

Technical Problem

The present disclosure is designed to solve the problem such as those described above, and therefore, the present disclosure is directed to providing a battery pack with improved safety for preventing fires or stopping fires from spreading in the event of fires in the battery pack, reducing dangers from fires.

The present disclosure is further directed to providing a control method for avoiding car accidents, for example, accidents in electric vehicles using the battery pack.

Technical Solution

To achieve the object such as those described above, a battery pack according to the present disclosure includes one or more cells, each cell including an electrode assembly comprising a positive electrode, a negative electrode and a separator and a pouch-type battery case to receive the electrode assembly, wherein the cell is received and stacked by a module case, the module case has a fire retarding material or fire extinguishing agent inside or outside, and the fire retarding material or fire extinguishing agent is automatically discharged from the module case when swelling of the cell occurs.

In an embodiment of the battery pack of the present disclosure, the fire retarding material or fire extinguishing agent may be configured to be placed as fire extinguishing powder in lump on inner walls of the module case and falls toward the cell as the walls of the module case are spread apart due to swelling of the cell.

The fire retarding material or fire extinguishing agent may be configured to be placed in the module case, and sprayed toward the cell when the module case is spread apart or split open due to swelling of the cell.

The fire retarding material or fire extinguishing agent is preferably disposed in an empty space within the module case. Particularly, the fire retarding material or fire extinguishing agent is preferably disposed at an upper end of the module case so that it is disposed on a surface at which an electrode lead of the cell is present.

When the module case is manufactured such that the fire retarding material or fire extinguishing agent is pre-filled through the empty space within the module case, and is constructed with the above structure, the need to form an extra space for placing the fire retarding material or fire extinguishing agent is eliminated, reducing difficulties in ensuring a space.

In this instance, the discharge of the fire retarding material or fire extinguishing agent may be induced by a signal of a control unit, and the fire retarding material or fire extinguishing agent may be powder or liquid.

The horizon detection sensor determines the horizontal plane of the walls of the module case. As the module case is placed in close contact with the cell, when overcharge situation occurs, the cell swells and the walls of the module case are also spread apart, for example, in a semicircular shape. Multiple horizon detection sensors may be installed at a predetermined interval to detect distortion of the walls of the module case.

A control method according to the present disclosure includes setting a first reference value in an MCU included in a BMS of the battery pack, the first reference value being a value representing that walls of the module case are distorted compared to a horizontal plane in normal condition but are within an acceptable range, providing warning notification to the MCU included in the BMS of the battery pack when the walls of the module case are distorted as much as the first reference value or more compared to the horizontal plane in normal condition, and measuring, by the MCU, a current cell voltage through ASIC IC which measures cell voltage and determining whether the cell voltage is in overvoltaged (OV) condition. When the cell voltage is normal, the control method includes maintain a warning signal for a few seconds or a few minutes and returning to the normal condition. If the cell voltage is in overcharged condition (the cell voltage is higher than a full charge value), the control method includes shutting off relay of the battery pack to prevent currents from flowing and consequently stop charging (notifying that the relay will be shut off after a few seconds or a few minutes if the vehicle is driving).

Furthermore, when the distortion of the horizontal plane continues for at least a predetermined period of time (a few minutes or a few hours), the control method includes providing notification to an ECU of the vehicle including the battery pack through the MCU to force a driver to get the vehicle inspected.

Additionally, the control method includes setting a second reference value in the MCU, the second reference value being a value that is greater than the first reference value and is used to determine an abnormal situation in which it is required to shut off relay of the battery pack, and when the walls of the module case are distorted as much as the second reference value or more compared to the horizontal plane in normal condition, sending an abnormality signal to the MCU and directly to the ECU to shut off relay of the battery pack (notify that the relay will be shut off after a few seconds or a few minutes if the vehicle is driving) and notify of abnormal situation of the vehicle to force the driver to stop the vehicle, eventually avoiding accidents.

In an embodiment of another battery pack of the present disclosure, the module case may be configured to receive each cell inside and the fire retarding material or fire extinguishing agent may be disposed between each module case using an adhesive, and when adhesive surfaces are spread apart due to swelling of the cell, the fire retarding material or fire extinguishing agent may be diffused.

The fire retarding material or fire extinguishing agent may be covered with a thin film or a film of a material that dissolves well in the event of a fire, and attached between the module cases or to the inside of the module case through the adhesive. When the fire retarding material or fire extinguishing agent is attached to the inside of the module case, the fire retarding material or fire extinguishing agent may be on the upper end of the cell easy to spatially use. When the fire retarding material or fire extinguishing agent is attached to the surface where an electrode lead is present, it can be applied without damaging the entire structure.

The fire retarding material or fire extinguishing agent may be one type of material selected from the group consisting of calcium carbonate, ammonium dihydrogen phosphate, and halogen compound.

Advantageous Effects

According to the present disclosure, when any cell included in the battery pack is swollen due to overcharge and malfunction, the fire retarding material or fire extinguishing agent is automatically discharged to prevent fires and rapidly stop fires from spreading in the event of tires caused by cell failure. It is possible to effectively suppress fires without any extra spray device or temperature/pressure sensor, and to suppress fires in simple and economically efficient manner.

According to the present disclosure, the fire retarding material or fire extinguishing agent is placed inside or outside the module case having cells received therein and automatically discharged in the event of cell swelling, so that the fire retarding material or fire extinguishing agent is accurately sprayed toward a source of ignition at proper timing, thereby suppressing fires in the early stages, and the fire retarding material or fire extinguishing agent is installed at an allowable space of the module case in the battery pack, thereby reducing extra production costs and eliminating the need for an extra space for installing a fire extinguisher.

According to the present disclosure, it is possible to prevent the battery pack from causing fires effectively and quickly, leading to improved safety of the battery pack.

Particularly, according to an aspect of the present disclosure, it is possible to greatly reduce the risk of the battery pack causing fires even when the battery pack is highly prone to causing fires due to vehicle collisions when it is used as an automotive battery pack.

As described above, according to the present disclosure, it is possible to prevent damage in the battery pack caused by fires occurred in the battery pack or additional damage to human life and property due to the spread of fires to another device or equipment.

In addition, according to the control method using the battery pack in accordance with the present disclosure, the fire retarding material or fire extinguishing agent is sprayed through distortion of the module case wall and charging is disallowed when overcharged, and when the distorted states continues or the degree of distortion is severe, notification is provided to a driver of the vehicle including the battery pack to force the driver to get the vehicle inspected, thereby preventing accidents caused by malfunction of the battery pack and the vehicle including the same.

BRIEF DESCRIPTION OF THE DRAWINGS

The accompanying drawings illustrate a preferred embodiment of the present disclosure, and together with the following disclosure, serve to provide further understanding of the technical features of the present disclosure, and thus, the present disclosure is not construed as being limited to the drawings.

MODE FOR CARRYING OUT THE INVENTION

The present disclosure will be apparent from a detailed description of the preferred embodiments of the present disclosure by referring to the accompanying drawings. It should be understood that the disclosed embodiments are provided for illustrative purposes to help the understanding of the present disclosure, and the present disclosure may be modified and embodied in many different forms from the disclosed embodiments. Furthermore, to help the understanding of the present disclosure, the accompanying drawings are not shown at actual scale and the dimension of some elements may be exaggerated.

Hereinafter, the preferred embodiments of the present disclosure will be described in detail with reference to the accompanying drawings. Prior to the description, the terms or words used in the specification and the appended claims shall not be construed as limited to general and dictionary meanings, but interpreted based on the meanings and concepts corresponding to technical aspects of the present disclosure on the basis of the principle that the inventor is allowed to define terms appropriately for the best explanation.

Accordingly, the embodiments stated herein and illustrations in the drawings are just the most preferred embodiment of the present disclosure, and do not represent all the technical aspects of the present disclosure, so it should be understood that many other equivalents and variations may be made thereto at the time the application is filed.

Figure 1:
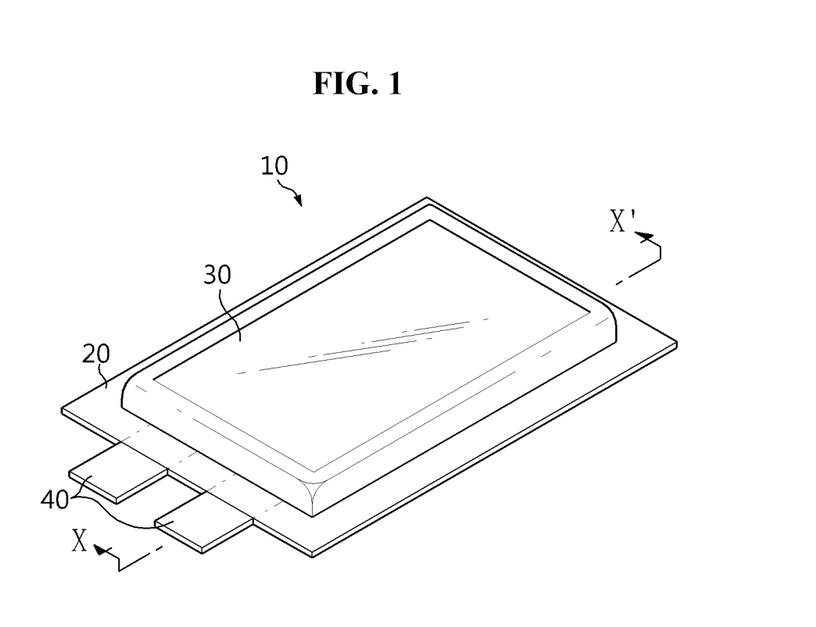
FIG. 1 is a perspective view showing an example of a pouch-type cell provided in the present disclosure.

FIG. 1 is a perspective view showing an example of a pouch-type cell provided in the present disclosure. Referring to FIG. 1, the cell 10 has a structure in which an electrode assembly 30 is embedded in a battery case 20 of a laminate sheet including a resin layer and a metal layer and the pouch-type battery case 20 is sealed along the outer peripheral surface by heat fusion.

The electrode assembly 30 includes a positive electrode and a negative electrode, and a separator interposed between to prevent a short circuit between the two electrodes. Each electrode plate is formed by applying an active material slurry to a current collector made of a metal foil. The electrode plate has an uncoated region to which the slurry is not applied. At the uncoated region, an electrode tab is generally installed, one in each electrode plate. The electrode tab is drawn out of the battery case 20 by welding with an electrode lead 40 to form a portion of a pathway for connecting the electrode assembly 30 to an external circuit during charge and discharge. The electrode assembly 20 may have the electrode leads 40 formed in two directions such that one is drawn upward and the other is drawn downward, and the electrode leads 40 formed in one direction such that two are all drawn upward. This embodiment takes one direction as an example.

The battery case 20 in which the electrode assembly 30 is received together with an electrolyte solution is hermetically sealed. The cell 10 is in the shape of a plate with an approximately rectangular parallelpiped structure having a small thickness relative to width. The battery case 20 has a laminate sheet structure in which an outer coating layer made of polymer resin having good durability, a shield layer made of a metal material having resistance to moisture and air, and an inner sealant layer made of polymer resin allowing heat fusion are stacked in a sequential order.

The cell 10 is not limited to a particular type and includes any secondary battery capable of providing high voltage and high current when constructing a battery pack, and preferably, a lithium secondary battery having a large energy storage amount per volume.

The cells 10, as shown in FIG. 1, each held along the thermally welded outer peripheral surface, may be fixed between cartridges that can form a battery cell stack, to construct a module or pack, or each cell 10 may be received in a module case. The module or pack may be composed of the single cell 10 or may be constructed by stacking the multiple cells 10. The present disclosure provides a battery pack including the module as a unit module. The battery pack may be manufactured by combining the unit modules depending on the desired output and capacity, and when mounting efficiency and structural stability is taken into account, the battery pack may be preferably used as a power source for electric vehicles, hybrid electric vehicles, plug-in hybrid electric vehicles and energy storage systems, but the range of applications is not limited thereto.

FIGS. 2 to 5 are schematic cross-sectional views showing the structure of the battery packs according to an embodiment of the present disclosure.

FIGS. 2 to 5 show a cross section of a battery pack taken along the stack direction, in which the cells 10 such as one shown in FIG. 1 are received and stacked in a module case 50, for example, a cross section taken along X-X' in FIG. 1. In FIGS. 2 to 5, (a) shows normal condition, and (b) shows the cell 10 in swollen condition.

Although FIGS. 2 to 5 illustrate the battery pack having two or three cells 10, the number of the cells 10 provided in the battery pack and the shape of the module case 50 is not limited to this embodiment and may be arbitrarily provided according to the use or purpose intended by those skilled in the art. The number of cells 10 used may be one or more.

Figure 2:
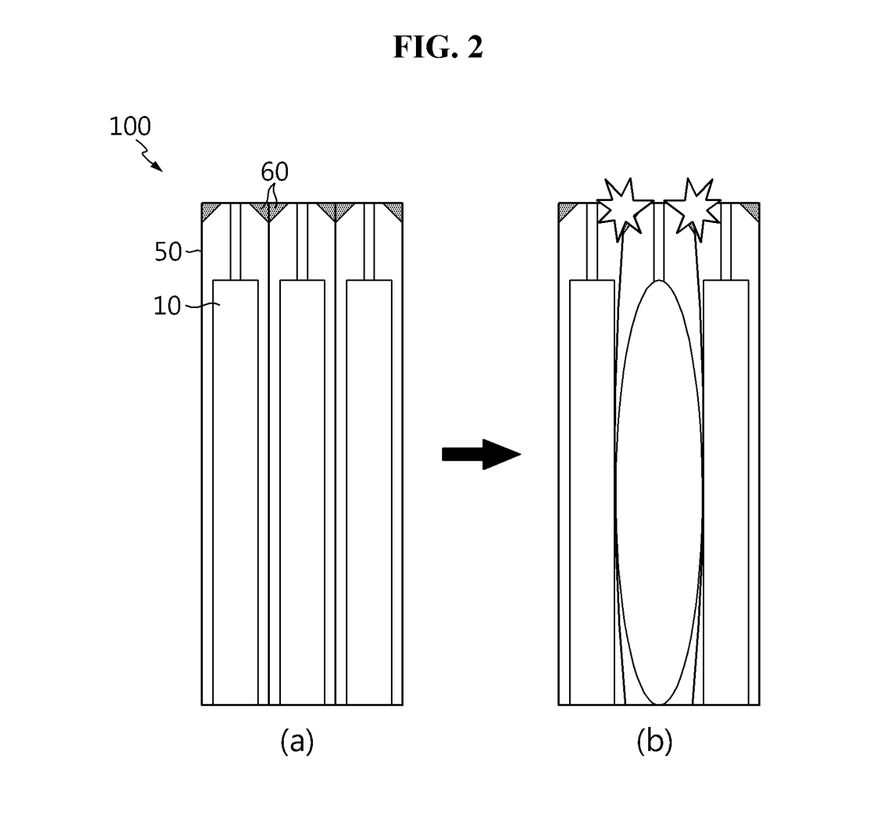
FIG. 2 is a schematic cross-sectional view showing the structure of a battery pack according to an embodiment of the present disclosure.

First, referring to (a) in FIG. 2, the battery pack 100 includes the cells 10 received and stacked by the module case 50, and the module case 50 has a fire retarding material or fire extinguishing agent 60 inside. When swelling of the cell 10 occurs as shown in (b), the fire retarding material or fire extinguishing agent 60 is automatically discharged from the module case 50.

As described above, the multiple cells 10 are included in the battery pack 100, and the cell 10 may be swollen due to overcharge and malfunction. The present disclosure is characterized in that the fire retarding material or fire extinguishing agent is discharged on the basis of swelling of the cell 10 without using conventional fire detection means such as a temperature or pressure sensor.

Going into the details of (a) in FIG. 2, the fire retarding material or fire extinguishing agent 60 in normal condition is disposed on the inner walls of the module case 50 as a lump of fire extinguishing powder. When swelling occurs due to malfunction as shown in (b), the cell 10 bulges and the walls of the module case 50 are spread apart, and accordingly the fire retarding material or fire extinguishing agent 60 falls toward the cell 10.

In relation to this, the fire extinguishing agent is a material or a mixed material that does a fire extinguishing activity, i.e., preferably fire retarding activity and/or retards or disturbs the occurrence of fires. The fire extinguishing activity refers to, in relation to the present disclosure, preferably activity to retard fires, i.e., suppress or repress the succession or occurrence of fires. Typical examples of the fire extinguishing agent or desirable constituent materials of the fire extinguishing agent include materials that remove a chemical reactant causing a succession of fires from a fire source, or cool down to an ignition point, or repress a chemical reaction necessary for causing or sustaining fires, and for example, materials that extinguish fires by negative catalytic action as well as prevent combustion by isolating an oxygen source by an asphyxiating activity of carbon dioxide produced by pyrolysis so that the oxygen concentration is reduced to about 16%.

In relation to the present disclosure, the fire retarding material or fire extinguishing agent preferably includes those that are readily available and simple to handle. They may be powder or liquid. Here, the fire retarding material or fire extinguishing agent is a material suitable for preventing or extinguishing fires by pushing or removing a chemical agent necessary for causing or sustaining fires or accelerating fires from a fire zone.

The fire retarding material or fire extinguishing agent 60 includes any material having a fire extinguishing effect. For example, the fire retarding material or fire extinguishing agent 60 includes white-colored sodium bicarbonate ($NaHCO_3$) known as type 1 fire extinguishing powder treated with zinc stearate or magnesium for damp proofing, purple-colored potassium bicarbonate ($KHCO_3$) known as type 2 fire extinguishing powder treated with zinc stearate or magnesium for damp proofing, pale pink-colored ammonium dihydrogen phosphate ($NH_4H_2PO_4$) known as type 3 fire extinguishing powder treated with silicone oil for damp proofing, and powder of a compound of component known as type 4 fire extinguishing powder and potassium carbonate. The present disclosure does not have limitation on the type of the fire retarding material or fire extinguishing agent 60, and includes a type of material selected from the group consisting of calcium carbonate ($CaCO_3$), ammonium dihydrogen phosphate, and halogen compound. Among them, the halogen compound is an evaporating liquefied fire extinguishing material.

To allow the fire retarding material or fire extinguishing agent 60 which is maintained in normal condition to fall down toward the cell 10 when the walls of the module case 50 are spread apart, the fire retarding material or fire extinguishing agent 60 may be configured to be provided in or on the walls of the module case 50 and covered with a film having weak strength so that the film is peeled off when the walls of the module case 50 are spread apart to discharge the fire retarding material or fire extinguishing agent 60 toward the cell 10. Of course, other examples are possible.

For example, the fire retarding material or fire extinguishing agent 60 may have a structure in which it is put in the module case 50, and when the module case 50 is spread apart or cracks by swelling of the cell 10, it is sprayed toward the cell 10. The fire retarding material or fire extinguishing agent 60 may be powder or liquid.

As shown in FIG. 2, when the module case 50 is fabricated such that the fire retarding material or fire extinguishing agent 60 is provided through an empty space inside the module case 50, or the fire retarding material or fire extinguishing agent 60 is pre-filled on the inner part of the walls of the module case 50, and then is constructed with the above structure, the need to form an extra space for placing the fire retarding material or fire extinguishing agent 60 is eliminated, reducing difficulties in ensuring a space.

As described above, according to the present disclosure, when the module case 50 is spread apart due to swelling of the cell 10, the fire retarding material or fire extinguishing agent 60 is automatically discharged, thereby preventing fires or stopping fires from spreading even if the fires occur.

As described above, the present disclosure can dramatically enhance safety raised as a problem of conventional lithium secondary batteries, and particularly when the battery pack 100 is used in electric vehicles, contribute to the significant improvement in safety.

Figure 3:
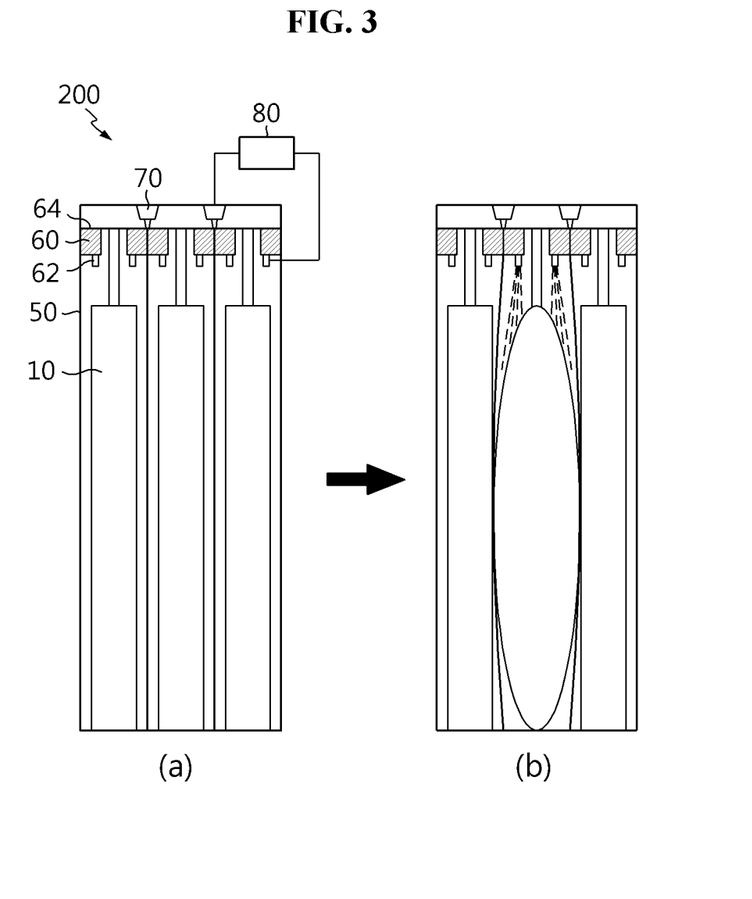
FIG. 3 is a schematic cross-sectional view showing the structure of a battery pack according to another embodiment of the present disclosure.

Next, referring to (a) in FIG. 3, in a battery pack 200 as well, the cells 10 are received and stacked by the module case 50, and the module case 50 has the fire retarding material or fire extinguishing agent 60 inside. Preferably, the fire retarding material or fire extinguishing agent 60 is received in a container 64 having the spray device 62. When swelling of the cell 10 occurs, the fire retarding material or fire extinguishing agent 60 is automatically discharged from the module case 50 as shown in (b).

Going into the details of (a) in FIG. 3, the battery pack 200 further includes a horizon detection sensor 70 to detect distortion of the walls of the module case 50 caused by swelling of the cell.

The horizon detection sensor 70 determines the horizontal plane of the walls of the module case 50. As the module case 50 is placed in close contact with the cell 10, when an overcharge situation occurs, the cell 10 swells and the walls of the module case 50 are also spread apart, for example, in a semicircular shape. Multiple horizon detection sensors 70 may be installed at a predetermined interval to detect distortion of the walls of the module case 50.

In normal condition such as (a) of FIG. 3, the walls of the module case 50 are not distorted, so the horizon detection sensor 70 does not output an abnormality signal. When swelling occurs as shown in (b), the horizon detection sensor 70 determines that the walls of the module case 50 are distorted and outputs an abnormality signal. When a control unit 80 is configured to spray the fire retarding material or fire extinguishing agent 60 in response to the received abnormality signal, the fire retarding material or fire extinguishing agent 60 is sprayed toward the cell 10 in this swelling situation. That is, this embodiment further includes the horizon detection sensor 70 and the control unit 80, the control unit 80 is controlled by the horizon detection sensor 70 to generate signals that are transmitted to the spray device 62, and the signals induce the discharge of the fire retarding material or fire extinguishing agent from the container 64 holding the fire retarding material or fire extinguishing agent 60.

In this embodiment, the shape of the spray device 62 and the container 64 is provided for illustration, and the spray device 62 and the container 64 may have any shape if they may be provided in any empty space created between the cell 10 and the module case 50. Furthermore, the control unit 80 may be provided in the module case 50.

On the other hand, in the above embodiments, the module case 50 may include a cartridge in a frame form and a cover. In the following embodiment, the module case 50 is a case with 1:1 structure in which the module case 50 receives each cell 10 inside.

Figure 4:
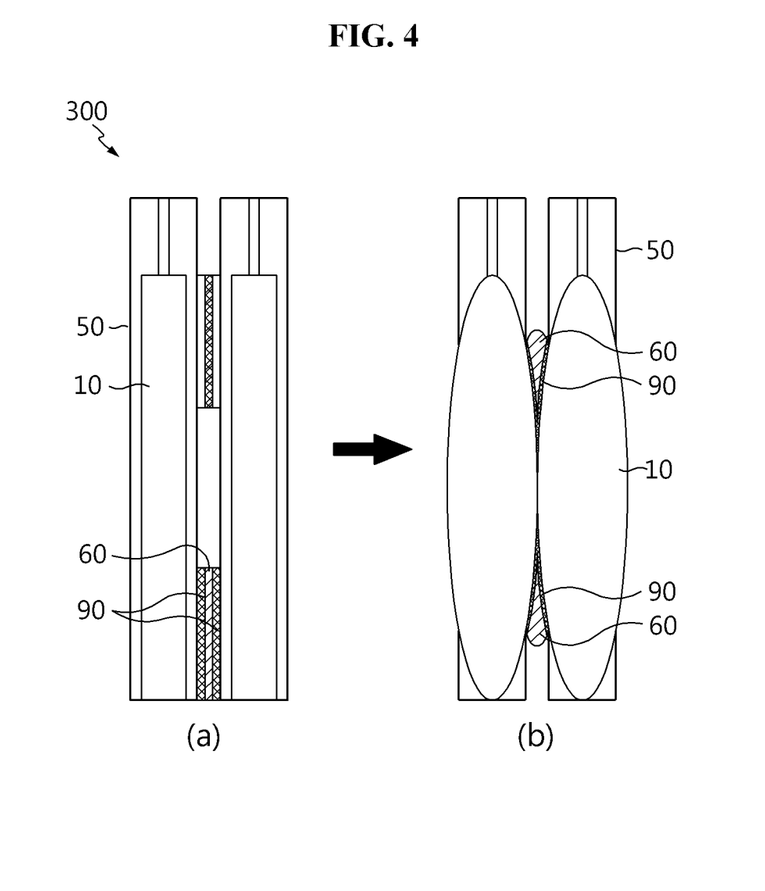
FIG. 4 is a schematic cross-sectional view showing the structure of a battery pack according to still another embodiment of the present disclosure.

Referring to (a) in FIG. 4, in a battery pack 300, the module case 50 is configured to receive each cell 10 inside, and the fire retarding material or fire extinguishing agent 60 is disposed between each module case 50 using an adhesive 90. When the adhesive surfaces are spread apart due to swelling of the cell 10 as shown in (b), the fire retarding material or fire extinguishing agent 60 is diffused.

Figure 5:
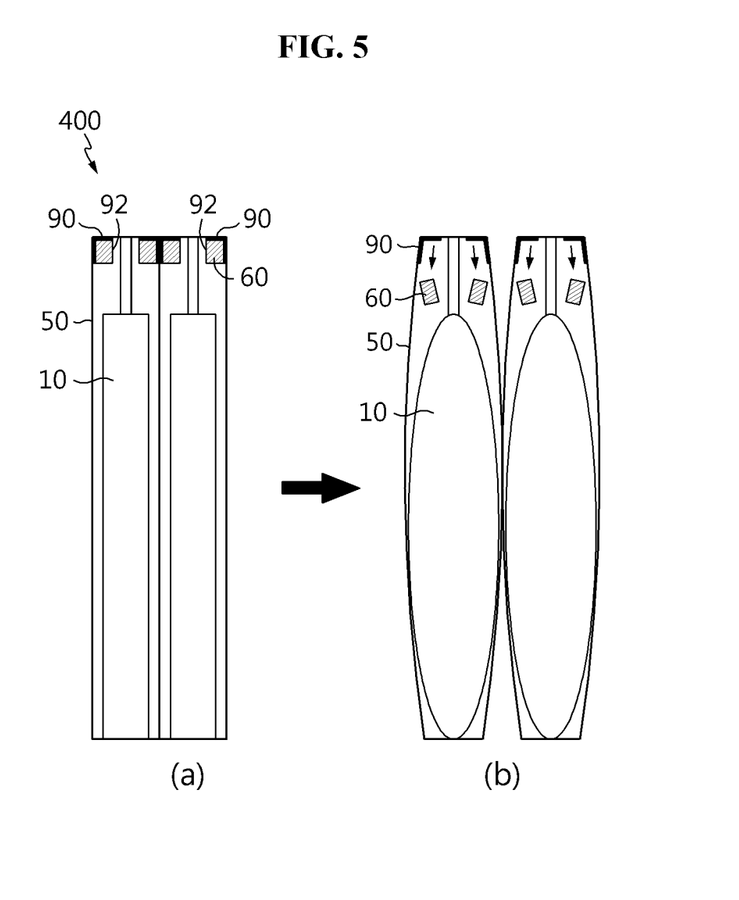
FIG. 5 is a schematic cross-sectional view showing the structure of a battery pack according to yet another embodiment of the present disclosure.

On the other hand, in the case of using the adhesive 90, a structure such as FIG. 5 is possible.

Referring to (a) in FIG. 5, in the battery pack 400, the fire retarding material or fire extinguishing agent 60 may be covered with a thin film or a membrane 92 of a material which is apt to melt in the event of fires, and attached to the inside of the module case 50 through the adhesive 90. Of course, the fire retarding material or fire extinguishing agent may be attached between the module cases 50 as in (a) of FIG. 4.

As described above, when it is attached to the inside of the module case 50, it is disposed on the upper end of the cell 10 that is easy to spatially use as shown in FIG. 2. As described above, when it is attached to the surface where the electrode lead (40 in FIG. 1) of the cell 10 is present, it can be applied without damaging the entire structure. When the adhesive interface is spread apart due to swelling of the cell 10 as in (b) of FIG. 5, when a thin film or a membrane 92 of a material which is apt to melt in the event of fires is peeled off or melted, the fire retarding material or fire extinguishing agent 60 is discharged or diffused toward the cell 10.

As described above, the present disclosure places the fire retarding material or fire extinguishing agent inside or outside the module case of the battery pack and automatically discharges the fire retarding material or fire extinguishing agent when a cell gets swollen, thereby preventing fires, and stopping fires from spreading quickly even if the fires take place, and as a consequence, minimizing secondary damage such as battery explosions. Particularly, when the battery pack is mounted in vehicles such as hybrid electric vehicles or electric vehicles, there is an excellent effect on the protection of drivers and passengers from fires.

Most of the conventional extinguishing devices have temperature and pressure sensors to detect occurrences of fires in the battery pack, and is equipped with a fire extinguisher connected to the sensor near the battery pack, so when a fire is detected from the sensor, fire extinguisher operates to suppress the fire. However, the conventional extinguishing device fails to operate the fire extinguisher when the sensor fails to sense the occurrence of fires. Furthermore, even though the sensor works and senses the occurrence of fires, when the spray direction of the fire extinguisher is inaccurate or the spray timing is improper, fires are not perfectly suppressed. Moreover, the conventional extinguishing device for suppressing battery pack fires has the increased volume because it cannot be mounted in the battery pack.

The present disclosure places the fire retarding material or fire extinguishing agent in the battery pack and automatically discharges the fire retarding material or fire extinguishing agent when a cell gets swollen, to accurately spray the fire retarding material or fire extinguishing agent toward a source of ignition at proper timing without a separate fire detecting sensor, thereby suppressing fires in the early stages, and can install the fire retarding material or fire extinguishing agent at an allowable space in the battery pack, thereby reducing extra production costs and eliminating the need for a separate installation space. As described above, the present disclosure solves the problems of the conventional art.

On the other hand, an electric vehicle with the battery pack 200 as described with reference to FIG. 3 can be controlled through a control method according to the present disclosure as below.

Figure 6:
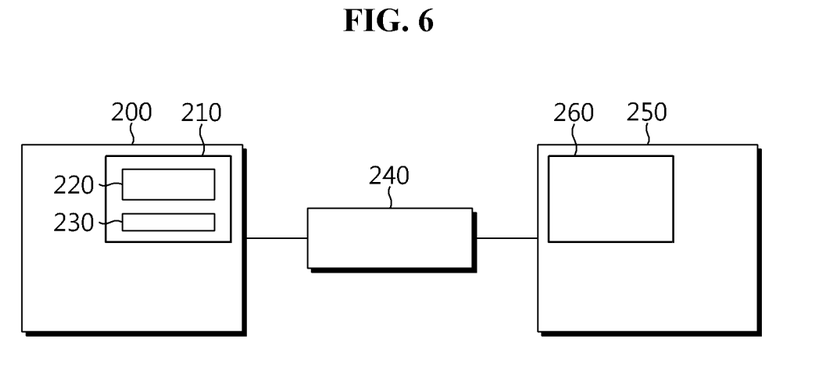
FIG. 6 is a diagram illustrating a control method according to the present disclosure.
Figure 7:
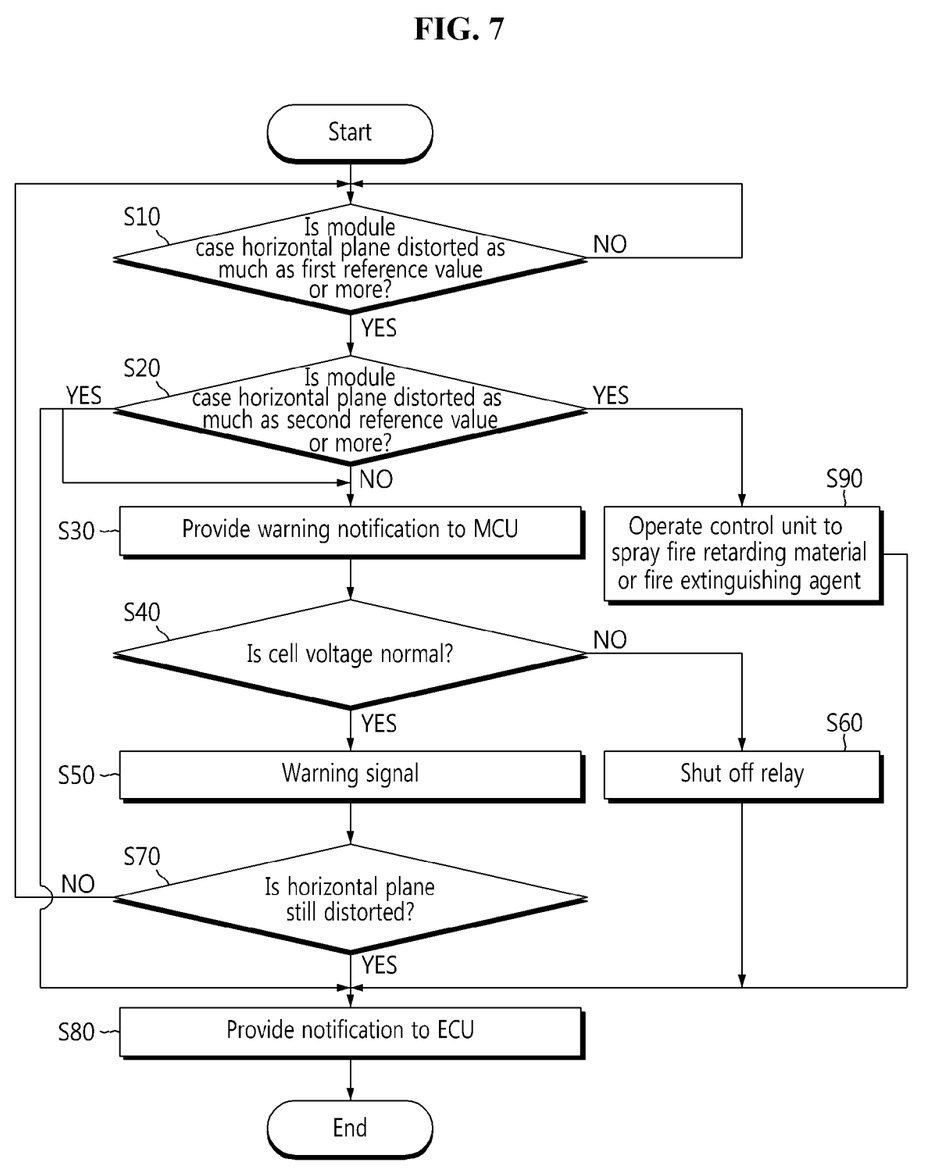
FIG. 7 is a flowchart illustrating a control method according to the present disclosure.

FIG. 6 is a diagram for illustrating the control method according to the present disclosure, and FIG. 7 is a flowchart for illustrating the control method according to the present disclosure.

Referring to FIGS. 3, 6 and 7 together, in the battery pack 200, the horizon detection sensor 70 determines the horizontal plane of the walls of the module case 50 (s10).

A first reference value, a second reference value and a third reference value are preset in a MCU 220 included in a BMS 210 of the battery pack 200 to determine the operation based on how much (in %) the walls of the module case 50 is distorted as compared to the horizontal plane in normal state. The first reference value is set as a value representing that the wall of the module case 50 is distorted as compared to the horizontal plane in normal state, but the degree of distortion is permissible. The second reference value is set as a value greater than the first reference value, and is used to determine an abnormal situation requiring a relay 240 of the battery pack 200 to be shut off. The third reference value is set as a value greater than or equal to the second reference value, and representing an abnormal situation as well as the degree requiring the fire retarding material or fire extinguishing agent 60 to be sprayed. The first to third reference values may differ depending on the type of the cell 10 or the battery pack 200, and can be adjusted by user settings. In this embodiment, the case in which the first reference value is 15%, the second reference value is 50%, and the third reference value is 60% is taken as an example.

When compared to the horizontal plane in normal state, the walls of the module case 50 are distorted more than the first reference value, in this embodiment, 15% (YES at s10), but are distorted less than the second reference value, in this embodiment, 50% (NO at s20), a warning notification is provided to the MCU 220 included in the BMS 210 of the battery pack 200 (s30). When the walls of the module case 50 are not distorted more than the first reference value, in this embodiment, 15%, compared to the horizontal plane in normal state (NO at s10), s10 is performed again. This process is repeated at a predetermined cycle.

The MCU 220 received the warning notification at s30 determines overvoltage (OV) by measuring the current cell voltage through an ASIC IC 230 which measures the voltage of the cell 10 (s40).

When the cell voltage is normal (YES at s40), the warning signal is maintained for a few seconds or a few minutes and returned to the normal state (s50).

Furthermore, when the horizontal plane is still distorted after a predetermined period of time (a few minutes to a few hours), that is to say, in the case of YES through determination at s70, notification is provided to an ECU 260 of a vehicle 250 including the battery pack 200 through the MCU 220 to force a driver to get the vehicle inspected (s80).

When the cell voltage is abnormal, i.e., when the cell voltage is really in an overcharge state (cell voltage is higher than a fully charged state value) (NO at s40), the relay 240 of the battery pack 200 is shut off (OFF) (notify that the relay will be shut off after a few seconds to a few minutes pass if it is driving) to block a flow of current and eventually prevent the charge (s60). Furthermore, notification is provided to the ECU 260 of the vehicle 250 including the battery pack 200 to force the driver to get the vehicle inspected (s80).

In addition, when the walls of the module case 50 are distorted more than the second reference value, in this embodiment, 50%, compared to the horizontal plane in normal state, i.e., when a determination value at s20 is YES, the abnormality signal is sent to the MCU 220 and directly the ECU 260 to shut off the relay 240 of the battery pack 200 (notify that the relay will be shut off after a few seconds to a few minutes pass if it is driving) to notify an abnormal situation of the vehicle to force the driver to stop the vehicle, eventually avoid accidents.

At the same time as sending the abnormality signal, or when the walls of the module case 50 are determined to be spread apart more than the third reference value, in this embodiment, 60%, greater than the second reference value, in this embodiment, 50%, compared to the horizontal plane in normal state, a fire can be suppressed in the early stages by a method which performs the operation to spray the fire retarding material or fire extinguishing agent 60 through the control unit 80 (s90). Furthermore, notification is provided to the ECU 260 of the vehicle 250 including the battery pack 200 to force the driver to get the vehicle inspected (s80).

As discussed hereinabove, the objects and advantages of the present disclosure will be understood by the above detailed description, and are apparent from the embodiments of the present disclosure. Furthermore, it will be readily understood that the objects and advantages of the present disclosure can be realized by the means set forth in the appended claims and combinations thereof. While the present disclosure has been hereinabove described with regard to a limited number of embodiments and drawings, the present disclosure is not limited thereto and it is obvious to those skilled in the art that various changes and modifications can be made thereto within the technical aspects of the present disclosure and the scope of equivalents to which the appended claims are entitled.

What is claimed is:

1. A battery pack comprising:
   a plurality of cells, each cell comprising an electrode assembly comprising a positive electrode, a negative electrode and a separator and a pouch-type battery case to receive the electrode assembly;
   an electrode lead extending upward from each of the plurality of cells;
   a module case, the plurality of cells stacked in the module case in a first direction;
   a plurality of dispensers inside the module case having a fire retarding material or fire extinguishing agent, the plurality of dispensers being above the pouch-type battery case of the plurality of cells and between the electrode leads of adjacent cells,
   wherein the plurality of dispensers includes a dispenser on a first side of the electrode lead of each battery cell and a dispenser on a second side of the electrode lead of each battery cell, and
   wherein the fire retarding material or fire extinguishing agent is automatically discharged when swelling of the cell occurs.

2. The battery pack according to claim 1, wherein the fire retarding material or fire extinguishing agent is placed as fire extinguishing powder in lump on a top wall of the module case and falls toward the cell as the walls of the module case are spread apart due to swelling of the cell.

3. The battery pack according to claim 1, wherein the fire retarding material or fire extinguishing agent is sprayed toward the cell when the module case is spread apart or split open due to swelling of the cell.

4. The battery pack according to claim 1, further comprising a horizon detection sensor to detect distortion of the walls of the module case caused by swelling of the plurality of cells, and when the horizon detection sensor determines that the walls of the module case are distorted, the fire retarding material or fire extinguishing agent is sprayed toward the plurality of cells.

5. The battery pack according to claim 4, wherein the fire retarding material or fire extinguishing agent is powder or liquid.

6. The battery pack according to claim 4, wherein the discharge of the fire retarding material or fire extinguishing agent is induced by a signal of a control unit.

7. The battery pack according to claim 1, wherein the fire retarding material or fire extinguishing agent is attached to the module case using an adhesive, and when adhesive surfaces are spread apart due to swelling of the cell, the fire retarding material or fire extinguishing agent is diffused.

8. The battery pack according to claim 7, further comprising a film of a material covering the fire retarding material or fire extinguishing agent, the film dissolving in the event of a fire.

9. The battery pack according to claim 1, further comprising a film of a material covering the fire retarding material or fire extinguishing agent, the film dissolving in the event of a fire.

10. The battery pack according to claim 1, wherein the fire retarding material or fire extinguishing agent is one type of material selected from the group consisting of calcium carbonate, ammonium dihydrogen phosphate, and halogen compound.

11. A control method of a vehicle comprising the battery pack according to claim 4, comprising:
    setting a first reference value in an MCU included in a BMS of the battery pack, the first reference value being a value representing that walls of the module case are distorted compared to a horizontal plane in normal condition but are within an acceptable range;
    providing warning notification to the MCU when the walls of the module case are distorted more than the first reference value compared to the horizontal plane in normal condition; and
    measuring, by the MCU, a current cell voltage through ASIC IC which measures cell voltage and determining whether the cell voltage is in overvoltaged (OV) condition, and when the cell voltage is normal, warning signaling followed by returning to the normal condition, and when the cell voltage is in overcharged condition, shutting off relay of the battery pack.

12. The control method according to claim 11, further comprising:
    providing notification to an ECU of the vehicle through the MCU when the distortion of the horizontal plane continues.

13. The control method according to claim 12, further comprising:
    setting a second reference value in the MCU, the second reference value being a value that is greater than the first reference value and is used to determine an abnormal situation in which it is required to shut off relay of the battery pack, and when the walls of the module case are distorted more than the second reference value compared to the horizontal plane in normal condition, sending an abnormality signal to the MCU and directly to the ECU to shut off relay of the battery pack and notify of abnormal situation of the vehicle.

* * * * *